(12) United States Patent
Jutte et al.

(10) Patent No.: US 9,574,356 B2
(45) Date of Patent: Feb. 21, 2017

(54) VEHICLE AND METHOD FOR TENDING TO AN ELEVATED LIVESTOCK CAGE

(71) Applicant: Cruiser Products, LLC, Coldwater, OH (US)

(72) Inventors: Brian Andrew Jutte, Ft. Recovery, OH (US); Michael Timothy McCain, Ft. Recovery, OH (US)

(73) Assignee: Cruiser Products, LLC, Fort Recovery, OH (US)

( * ) Notice: Subject to any disclaimer, the term of this patent is extended or adjusted under 35 U.S.C. 154(b) by 495 days.

(21) Appl. No.: 13/920,626

(22) Filed: Jun. 18, 2013

(65) Prior Publication Data

US 2014/0053665 A1    Feb. 27, 2014

Related U.S. Application Data

(60) Provisional application No. 61/692,052, filed on Aug. 22, 2012.

(51) Int. Cl.
| | | |
|---|---|---|
| *E04G 1/24* | (2006.01) | |
| *E06C 5/02* | (2006.01) | |
| *E04G 1/18* | (2006.01) | |
| *E06C 1/39* | (2006.01) | |
| *E06C 1/397* | (2006.01) | |
| *E04G 1/28* | (2006.01) | |

(52) U.S. Cl.
CPC . *E04G 1/24* (2013.01); *E06C 5/02* (2013.01); *E04G 1/18* (2013.01); *E04G 1/28* (2013.01); *E06C 1/39* (2013.01); *E06C 1/397* (2013.01)

(58) Field of Classification Search
CPC ........ A01M 31/02; B62D 51/02; B62K 5/003; B62K 5/007; B62K 5/08; B62K 2202/00; E04G 1/24; E04G 2001/242; E04G 2001/244; E06C 5/02
See application file for complete search history.

(56) References Cited

U.S. PATENT DOCUMENTS

| | | | | |
|---|---|---|---|---|
| 2,798,652 | A | * | 7/1957 | Easton ............................. 182/17 |
| 2,899,010 | A | * | 8/1959 | Ledgerwood ........... B62B 5/049 |
| | | | | 182/106 |
| 3,180,450 | A | * | 4/1965 | Crager et al. .................... 182/14 |
| 3,232,375 | A | * | 2/1966 | Warthen .......................... 182/13 |
| 3,276,542 | A | * | 10/1966 | Pommier ......................... 182/16 |
| 3,422,922 | A | * | 1/1969 | Aiken .............................. 182/14 |
| 3,429,398 | A | * | 2/1969 | Payne et al. ..................... 182/13 |
| 3,529,696 | A | * | 9/1970 | Jacobsen ........................ 182/129 |

(Continued)

FOREIGN PATENT DOCUMENTS

SU    379264 A1    4/1973

*Primary Examiner* — Colleen M Chavchavadze
(74) *Attorney, Agent, or Firm* — Frost Brown Todd LLC (57) ABSTRACT

A vehicle and method for tending to an elevated livestock cage includes a support frame, a base, a drive unit, and an elevated platform. The support frame extends upward from the base, and the drive unit is operatively attached to the base for moving the base along the aisle. The elevated platform is affixed to the support frame and is positioned above the base at a height suitable to facilitate access to the elevated livestock cage. The support frame and the elevated platform are configured to support an operator while moving the operator along an aisle of a confinement facility.

17 Claims, 8 Drawing Sheets

(56) References Cited

U.S. PATENT DOCUMENTS

| | | | |
|---|---|---|---|
| 3,537,546 A * | 11/1970 | Klosk | E04G 1/22 |
| | | | 182/131 |
| 3,684,055 A * | 8/1972 | Rice | 182/17 |
| 3,731,758 A * | 5/1973 | Hibma | 180/11 |
| 3,752,261 A * | 8/1973 | Bushnell, Jr. | E04G 1/22 |
| | | | 182/113 |
| 3,817,346 A * | 6/1974 | Wehmeyer | 182/14 |
| 3,930,548 A * | 1/1976 | Wallraff | 180/6.5 |
| 3,961,681 A * | 6/1976 | Fisher | 180/305 |
| 4,053,025 A * | 10/1977 | Slusarenko | 180/2.1 |
| 4,390,080 A * | 6/1983 | Bushnell, Jr. | B66F 11/04 |
| | | | 182/115 |
| 4,475,611 A * | 10/1984 | Fisher | 180/6.5 |
| 4,538,695 A * | 9/1985 | Bradt | 180/19.2 |
| 4,614,251 A * | 9/1986 | Hawkins | B66F 7/0625 |
| | | | 182/141 |
| 4,750,578 A | 6/1988 | Brandenfels | |
| 5,722,506 A * | 3/1998 | Takai | 182/16 |
| 6,039,148 A * | 3/2000 | Riegel | 182/16 |
| 6,076,621 A * | 6/2000 | Horn | 180/19.2 |
| 6,371,235 B1 | 4/2002 | Wisecarver | |
| 6,378,642 B1 | 4/2002 | Sutton | |
| 6,474,689 B2 | 11/2002 | Mulhern et al. | |
| 6,637,549 B1 * | 10/2003 | Lopacki | 182/127 |
| 6,851,498 B1 | 2/2005 | Sauve | |
| 6,860,512 B2 | 3/2005 | Lawson, Jr. | |
| 6,976,287 B2 * | 12/2005 | Muth | 15/340.1 |
| 7,341,121 B2 | 3/2008 | Flowers et al. | |
| 8,434,592 B1 * | 5/2013 | Young | 182/12 |
| 9,051,019 B2 * | 6/2015 | Reck | |
| 2007/0089931 A1 * | 4/2007 | Hunt | 182/129 |
| 2009/0155033 A1 * | 6/2009 | Olsen et al. | 414/462 |
| 2009/0205880 A1 * | 8/2009 | Hammonds | 180/6.48 |
| 2011/0297465 A1 * | 12/2011 | Huntley et al. | 180/65.1 |

* cited by examiner

VEHICLE AND METHOD FOR TENDING TO AN ELEVATED LIVESTOCK CAGE

CROSS-REFERENCE TO RELATED APPLICATION

This application claims the benefit of Application Ser. No. 61/692,052 filed Aug. 22, 2012, the disclosure of which is hereby incorporated by reference herein.

TECHNICAL FIELD

The present invention relates generally to a vehicle and method for tending to an elevated livestock cage in a confinement facility, and, more particularly, to a vehicle and method for tending to an elevated poultry cage.

BACKGROUND

Generally, livestock confinement facilities provide for increased livestock production with greater efficiency than traditional, agricultural facilities. In fact, for decades, many farmers have specifically selected confinement facilities in order to improve livestock health, increase livestock growth rates, and reduce production costs to generate cost savings from farmers to consumers. However, increased competition within the agricultural industry has decreased profit margins, resulting in the necessity for larger confinement facilities housing increased densities of livestock per square foot.

Specifically, modern poultry confinement facilities extend along a farm for hundreds of yards with similarly long, narrow aisles for maximizing poultry density with the confinement facility. Each aisle provides access to elevated livestock cages, such as poultry cages, arranged in rows and columns along generally the entire length of the confinement facility. Rather than reduce the amount of space for each animal to increase livestock density, farmers are more likely to increase the vertical stacking height of the elevated poultry cages. For example, elevated poultry cages may range in height from eight feet or more from the floor of the confinement facility. Thus, each animal receives enough space for proper health and growth rates while increasing the amount of animals within the confinement facility.

While increasing the vertical height of elevated poultry cages may help increase profit margins, the maintenance associated with elevated poultry cages currently tends to reduce these profits. The labor associated with inspecting, maintaining, and cleaning livestock cages and medically treating, feeding, and watering livestock is generally referred to as "tending" to the livestock. On one hand, a farm operator on foot may simply and efficiently tend to animals within easy reach from the aisle. On the other hand, tending to the animals within higher elevated poultry cages complicates even simple tasks, which increases time, expense, and burden on the farm operator.

For example, every elevated poultry cage is routinely inspected and cleaned while tending to the livestock. Typically, the farm operator inspects and cleans each elevated livestock cage by one of two known methods. For the first method, the farm operator walks along the aisle with a ladder, stopping at each column of elevated livestock cages. The farm operator places the ladder within the aisle and manually climbs the ladder to inspect and clean each cage. Once every livestock cage in the stacked column is clean, the farm operator moves the ladder over several feet and repeats this process for each side of the aisle along the length of the confinement facility. Unfortunately, this method is inefficient, tedious, and extremely time consuming. According to the second method, the farm operator inspects and cleans each livestock cage within reach of the aisle while on foot. Then, the farm operator uses stilts to walk back and forth along the entire length of the aisle while inspecting and cleaning each elevated cage. Despite being more efficient, stilt walking requires considerably more skill and often results in muscular exhaustion due to the need for regular tending of the livestock. As such, the physical labor required to use stilts for tending to elevated livestock cages is often difficult to find and retain.

There is a need for a vehicle and method for tending to elevated livestock cages in a confinement facility, particularly elevated poultry cages, that addresses present challenges and characteristics such as those discussed above.

SUMMARY

A vehicle for tending to an elevated livestock cage along an aisle in a confinement facility comprises a support frame, a base, and a drive unit. The support frame extends vertically upward from the base and has a lower portion and an upper portion. The drive unit is operatively attached to the base for moving the base along the aisle. The vehicle further comprises an elevated platform affixed to the upper portion of the support frame. The elevated platform is positioned above the base at a height suitable to facilitate access to the elevated livestock cage. The support frame and the elevated platform are configured to support an operator while tending to the elevated livestock cage.

Furthermore, the vehicle comprises a steering column and the drive unit has a plurality of wheels. The plurality of wheels is configured to support the base. At least one of the wheels is adapted to drive the base along the aisle and at least one of the wheels is adapted to steer the base. The steering column has a bottom end portion and a top end portion. The bottom end portion is operably connected to the at least one wheel adapted to steer the base, whereas the top end portion extends above the elevated platform. Furthermore, the base, the support frame, and the elevated platform have an overall width less than approximately 50 inches for supporting an operator while moving along the aisle of the confinement facility.

In use, a method of the operator tending to a plurality of elevated livestock cages comprises supporting the operator at a position on the elevated platform at the height suitable to facilitate access to the elevated livestock cage. The method also includes inspecting at least one elevated livestock cage from the position on the elevated platform and actuating the vehicle to position the vehicle adjacent to at least one of the plurality of the elevated livestock cages. Furthermore, the method includes observing at least one other elevated livestock cage and moving the vehicle along the aisle with the plurality of elevated livestock cages.

BRIEF DESCRIPTION OF THE DRAWINGS

The accompanying drawings, which are incorporated in and constitute a part of this specification, illustrate embodiments of the invention, and together with a general description of the invention given above and the detailed description given below serve to explain the invention.

DETAILED DESCRIPTION

Figure 1:
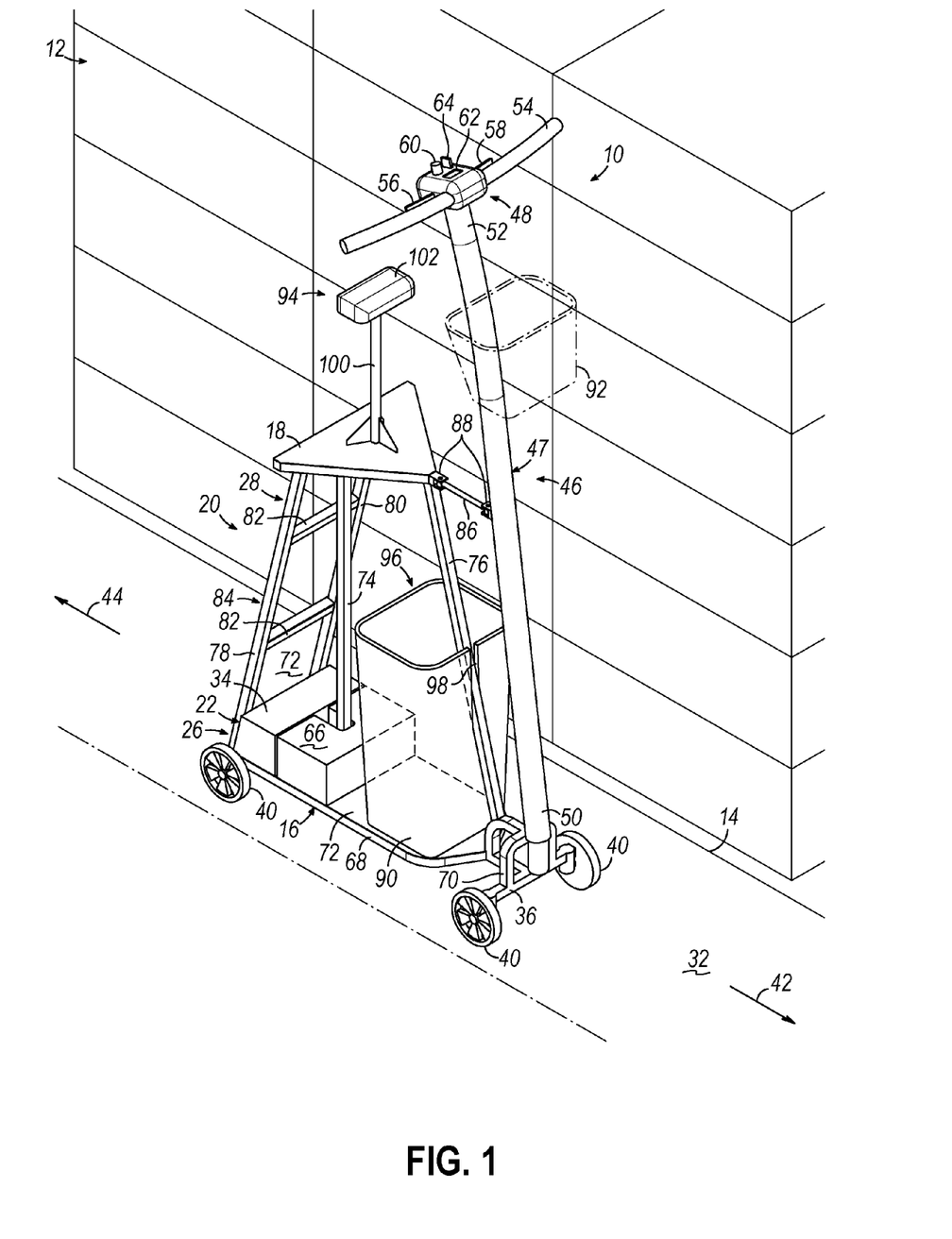
FIG. 1 is a front perspective view of a first embodiment of a vehicle for tending to an elevated livestock cage.
Figure 2:
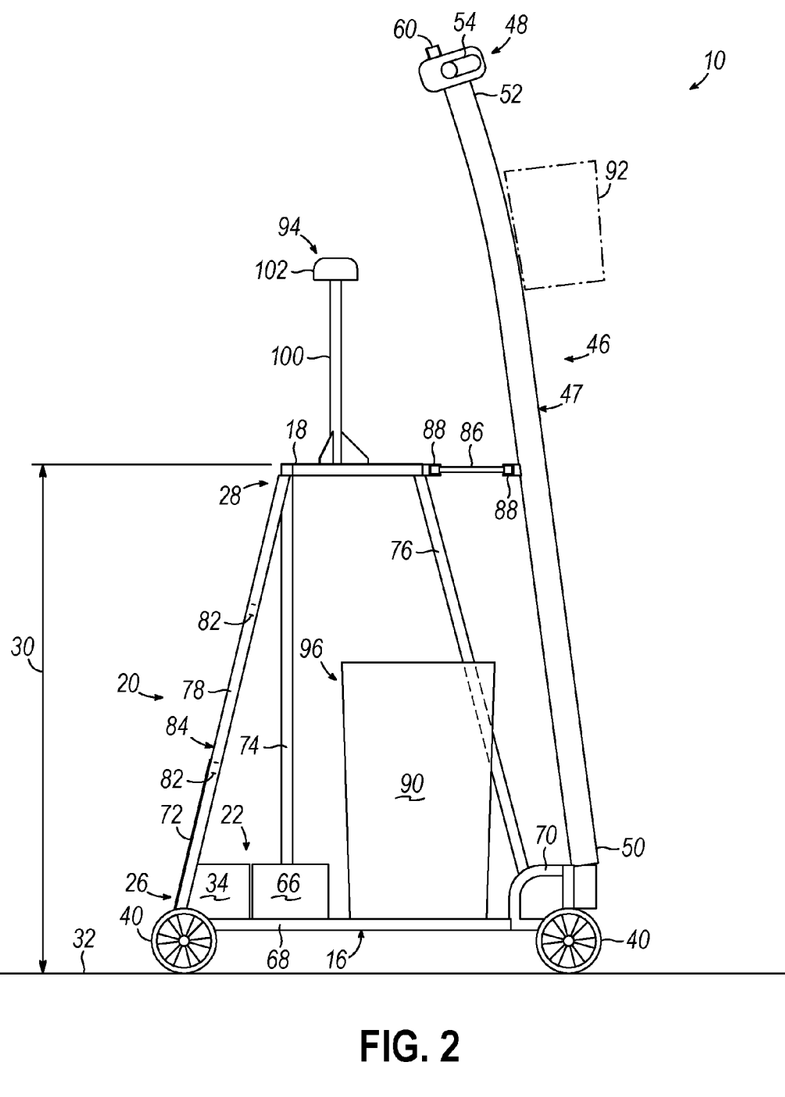
FIG. 2 is a side elevation view of the vehicle of FIG. 1.
Figure 3:
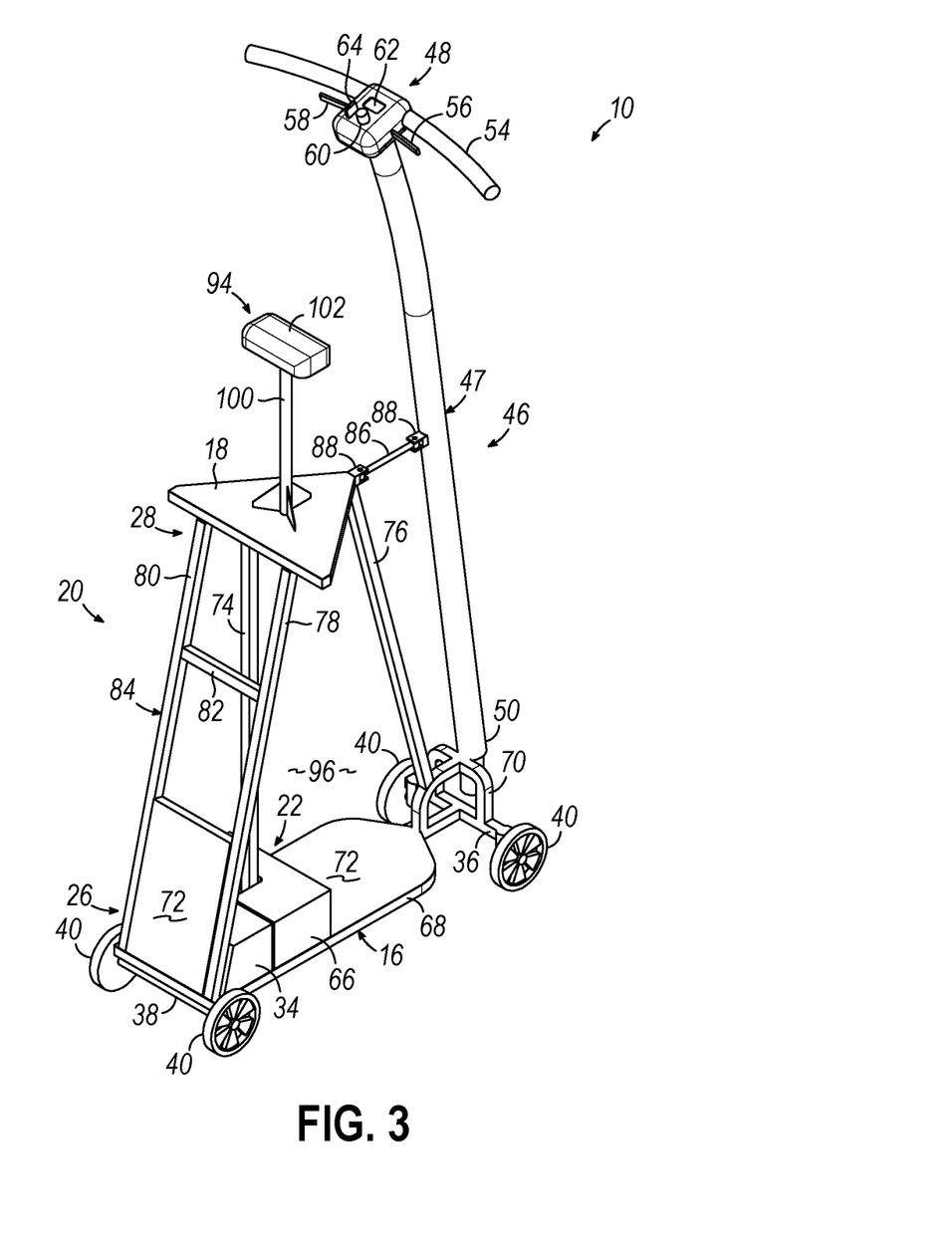
FIG. 3 is a rear perspective view of the vehicle of FIG. 1.

With reference to FIG. 1, a first exemplary embodiment of a vehicle 10 for tending to an elevated livestock cage 12 along an aisle 14 includes a base 16, an elevated platform 18, a support frame 20, and a drive unit 22. In the exemplary embodiment shown, the vehicle 10 has an overall width 24 (see FIG. 4) adapted to fit within the aisle 14 of a livestock confinement facility. For example, the width 24 may be less than 50 inches. More particularly, the width 24 may be between approximately 10 inches and 48 inches, e.g. approximately 19 inches. According to the exemplary embodiment of the invention shown in FIGS. 1-6, the support frame 20 has a lower portion 26 and an upper portion 28. The lower portion 26 is attached to the base 16. From the base 16 at the lower portion 26, the support frame 20 extends vertically upward to the upper portion 28. The elevated platform 18 is affixed on top of the support frame 20 at the upper portion 28 such that the elevated platform 18 is positioned at a height 30 (see FIG. 2) above the base 16 suitable to facilitate accessing the elevated livestock cage 12. The height 30 is generally defined by the distance between the elevated platform 18 and a floor 32 on which the vehicle 10 is positioned. The floor 32 may be any surface within the confinement facility on which the vehicle 10 is capable of traversing. The elevated platform 18 and the support frame 20 are configured to support an operator at the height 30 above the floor 32. In an exemplary embodiment, the height 30 may be approximately between two inches and approximately fifteen feet. More specifically, the height 30 is between approximately four feet and approximately fifteen feet. While the elevated platform 18 is positioned on top of the support frame 20 as shown in an exemplary embodiment, it will be appreciated that the support frame 20 may be configured in various other ways to position the elevated platform 18 at the height 30. The elevated platform 18 may alternatively be operatively adjustable to various heights as described below.

The drive unit 22 is operatively coupled to the vehicle 10 to selectively move the vehicle 10 about the confinement facility. As shown in FIGS. 1-6, the drive unit 22 is supported on the base 16. The drive unit 22 includes a drive mechanism 34, a front axle 36, a rear axle 38, and a plurality of wheels 40. The plurality of wheels 40 rotatably attach to the front and rear axles 36, 38 such that the plurality of wheels 40 supports the weight of the vehicle 10. The drive mechanism 34 drives, or otherwise propels, the movement of the vehicle 10 forward, as indicated by arrow 42, or rearward, as indicated by arrow 44, by applying torque to at least one of the plurality of wheels 40. More particularly, the drive mechanism 34 includes an electric motor (not shown) to generate torque via at least one of the plurality of wheels 40 to drive the vehicle 10. However, it will be appreciated that any known method of moving a vehicle may be used to move the vehicle 10 forward or rearward.

The vehicle 10 further includes a steering mechanism 46 having a steering column 47 and a controller 48. The steering column 47 has a bottom end portion 50 and a top end portion 52 that extends above the elevated platform 18. The steering column 47 is operatively coupled to at least one of the plurality of wheels 40 at the bottom end portion 50 to turn, or otherwise direct, the vehicle 10 side-to-side while moving forward or rearward. According to the exemplary embodiment, the plurality of wheels 40 includes a pair of rear wheels, which are driven, and a pair of front wheels, which are steerable. By driving the pair of rear wheels with the drive unit 22 and turning the pair of front wheels with the steering mechanism 46, the operator may selectively direct the plurality of wheels 40, and thus the vehicle 10, along the aisle 14 of the confinement facility. However, any number of wheels may be operatively driven to facilitate moving the vehicle 10. For instance, to improve the ability of the vehicle 10 to move, all four wheels may be operatively driven to increase traction within the confinement facility.

Figure 4:
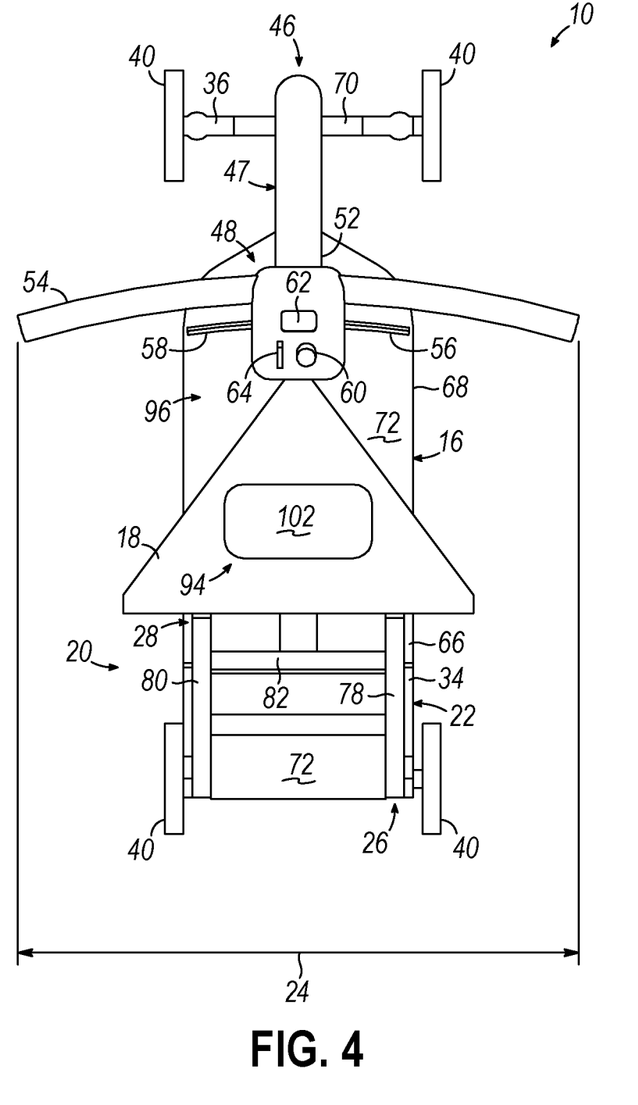
FIG. 4 is a top plan view of the vehicle of FIG. 1.
Figure 5:
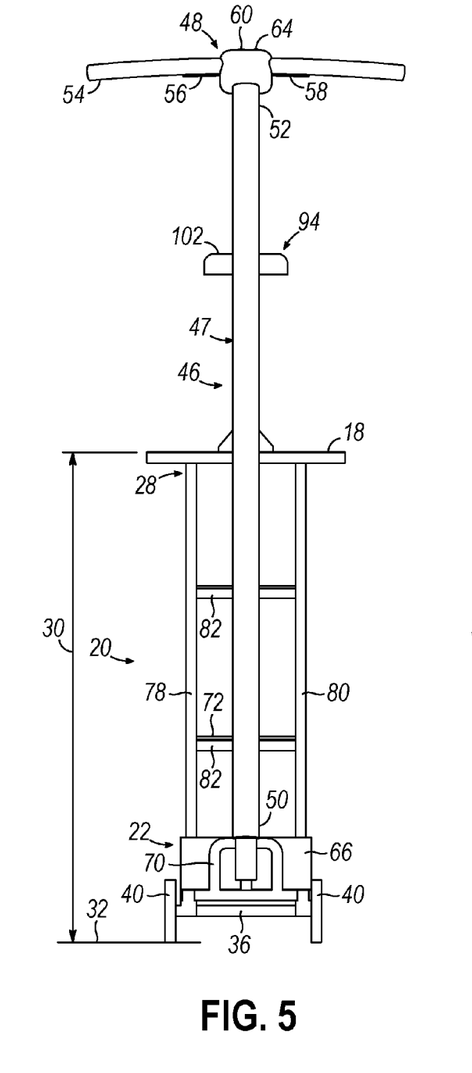
FIG. 5 is a front view of the vehicle of FIG. 1.
Figure 6:
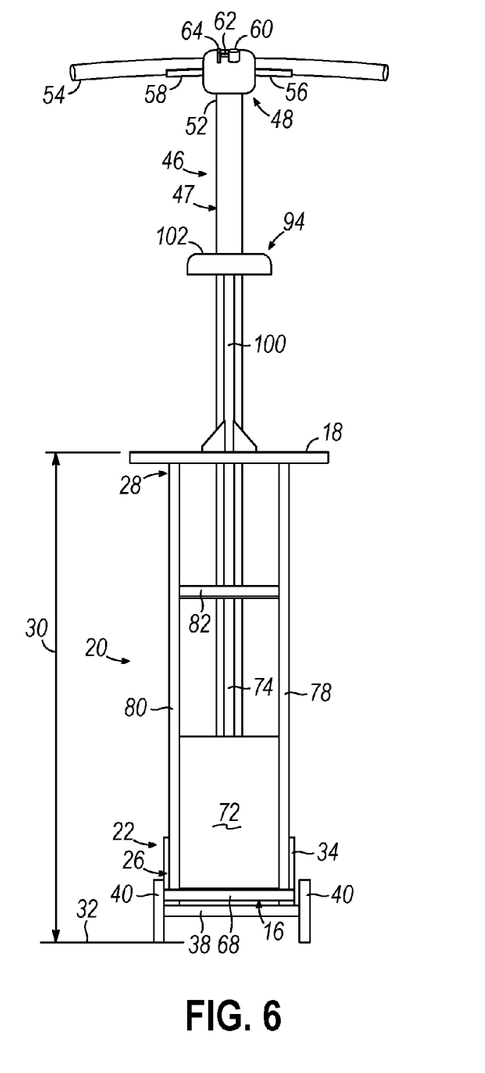
FIG. 6 is a rear view of the vehicle of FIG. 1.

The operator selectively directs the vehicle 10 from atop the elevated platform 18 via the controller 48, which is positioned above the elevated platform 18 at a location near the top end portion 52 of the steering column 47. As best shown in FIG. 4, the exemplary controller 48 includes a handle 54 rigidly connected to the steering column 47 and a forward and a reverse lever 56, 58 operatively communicating with the drive unit 22. The operator may selectively manipulate the handle 54 and selectively activate the forward and reverse levers 56, 58 to thereby direct the vehicle 10 along the aisle 14 of the confinement facility. In addition, the controller 48 may also include a speed knob 60, a display 62, and a power key 64. The speed knob 60 may be configured to set the forward and/or reverse movement of the vehicle 10 to a speed desired by the operator. The display 62 may provide visual indication to the operator concerning the status of the vehicle 10. For example, the display 62 may provide visual indication of power remaining to propel the vehicle 10. In an exemplary embodiment, the power key 64 is movable between an off position and an on position such that when the power key 64 is either in the off position or removed from the controller 48 entirely, the vehicle 10 is inoperable. However, when the power key 64 is in the on position, the vehicle 10 is operable by the operator. While the controller 48 described herein represents the exemplary embodiment shown in FIGS. 1-6, it will be appreciated that various other mechanisms or structures known for driving and steering a vehicle may be used to direct the vehicle 10.

The vehicle 10 further includes a power source 66 operatively coupled with the drive unit 22 and the controller 48. According an the exemplary embodiment of the invention, the power source 66 is a battery attached to the vehicle 10. More particularly, the battery is rechargeable and mounted to the base 16.

In an exemplary embodiment, the base 16 generally includes a base frame 68 and a front frame 70. The base frame 68 is positioned at the lower portion 26 of the support frame 20 and attached to the drive unit 22. More specifically, the rear axle 38 is rigidly affixed to the base frame 68 below the drive mechanism 34, which is mounted on top of the base frame 68. The front frame 70 is mounted forward of the base frame 68 and is rigidly attached thereto. The front axle 36 is mounted to the front frame 70. The steering column 47 is attached to the front frame 70 such that the front axle 36 is operatively coupled to the steering column 47. As shown in an exemplary embodiment of the invention, the base frame 68 is generally planar and fitted with a plurality of protective plates 72, such as aluminum plates, for sufficient durability for use in the confinement facility. In addition, the base 16, the drive unit 22, and/or the battery 66 are relatively heavy with respect to the remainder of the vehicle 10. Thus, in conjunction with the position of the base 16, the drive unit 22 and/or the battery 66 adjacent to the lower portion 26 of the support frame 20 are sufficiently heavy to inhibit the vehicle 10 from overturning during operation.

In an exemplary embodiment, the support frame 20 further includes a central support member 74, a forward support member 76, first and second rear support members 78, 80, and horizontal cross members 82. The central support member 74 is vertically positioned below the elevated platform 18 and attached at one end to the elevated platform 18 and at another end to the base frame 68. The first and second rear support members 78, 80 are attached at one end to the elevated platform 18 and at an opposite end to the rear of the base frame 68. Moreover, one or more horizontal cross members 82 extend from the first rear support member 78 to the second rear support member 80. The horizontal cross member 82 strengthens the lateral rigidity of the vehicle 10. The horizontal cross member 82 also cooperates with the first and second rear support members 78, 80 to define a ladder 84, which may be used by the operator in order to access the elevated platform 18. In order to protect the drive unit 22 from both the environment and from the operator using the ladder 84, one of the plates 72 may be coupled to the ladder 84, adjacent to the drive unit 22.

As discussed above, the elevated platform 18 is attached to the upper portion 28 of the support frame 20. In an exemplary embodiment, the elevated platform 18 is triangular in shape, having three ends and a center portion attached to the support frame 20. The triangular elevated platform 18 is rearwardly supported at two of the ends by the first and second rear support members 78, 80. In addition, the triangular elevated platform 18 is also forwardly supported at one of the ends, and centrally supported proximate the center portion by the forward support member 76 and the central support member 74, respectively. However, it will be appreciated that the elevated platform 18 may be other shapes and sizes for accommodating the operator and traversing the aisle 14.

In order to brace the steering column 47 during operation, a connecting member 86 may be attached at one end to the elevated platform 18 and at another end to the steering column 47. The connecting member 86 is adapted to hold the steering column 47 with sufficient rigidity to retain the steering mechanism 46 adjacent to the elevated platform 18. In an exemplary embodiment, each end of the connecting member 86 is attached via a ball joint 88 to the elevated platform 18 and the steering column 47. The ball joint 88 is adjustable for modifying the position and angle of the steering column 47 relative to the elevated platform 18. While the base 16, support frame 20, and connecting member 86 may be formed as described herein, it will be appreciated that various other configurations of the base 16, support frame 20, and connecting member 86 may alternatively be used. Thus, the configuration of the base 16, the support frame 20, and the connecting member 86 are not intended to be limited to the exemplary embodiments shown and described herein.

With continued reference to FIG. 1, the vehicle 10 may also include the ladder 84, a waste container 90, a storage container 92, and a seat 94 to aid the operator in tending to the elevated livestock cages 12. As shown in an exemplary embodiment of the invention, the ladder 84 is defined by the first and second rear support members 78, 80 and the horizontal cross members 82. However, the ladder 84 may alternatively comprise various other structures suitable to allow the operator to access the elevated platform 18.

In the an exemplary embodiment, the waste container 90 may be removably attached to the vehicle 10 as shown in FIG. 1. More particularly, the support frame 20 defines a space 96 for receiving the waste container 90 on top of the base 16. Generally, any waste container 90 sized to be received in the defined space 96 may be used in conjunction with the vehicle 10. The exemplary waste container 90 shown herein also includes a slot 98 adapted to the support frame 20 to provide for greater clearance between the waste container 90 and the forward support member 76. Thereby, the waste container 90 may be of greater volume than a smaller waste container without the slot 98. The slot 98 also helps to retain the waste container 90 on the support frame 20, because the support frame 20 is inserted into the slot 98.

According to an exemplary embodiment of the invention, the waste container 90 is positioned on the base 16 and generally below the elevated platform 18. As such, the operator is positioned on the elevated platform 18 directly above the waste container 90 and may effectively dispose of any waste collected while tending to the elevated cages 12 by simply dropping the waste into the waste container 90.

The storage container 92 may be attached to the vehicle 10 in order to provide the operator with a convenient storage location for tools, parts, or any other items of use to the operator while tending to the elevated livestock cages 12. As shown in an exemplary embodiment, the storage container 92 is attached to the steering column 47 such that the storage container 92 may be accessed by the operator positioned on the elevated platform 18. While the present storage container 92 is positioned on the steering column 47 in the exemplary embodiment, it will be appreciated that the storage container 92 may alternatively be mounted to various other locations on the vehicle 10.

Furthermore, as shown in FIGS. 1-6, the vehicle 10 may also include the seat 94 attached to the elevated platform 18 and extending upwardly therefrom. The seat 94 includes a support stand 100, which is mounted at one end to the elevated platform 18 and at the other end to a seat rest 102. The seat 94 is configured such that the operator may sit on the seat rest 102 and access the elevated livestock cage 12 therefrom. It will be appreciated that any known seat 94 may be so used. The seat 94 may also include additional features to facilitate adjusting the seat 94 to accommodate operators of varying size so that, generally, any operator may access the elevated livestock cages 12 from the seat 94. In the alternative, the vehicle 10 may not include the seat 94 to provide more area on the elevated platform 18 in which the operator may work.

Figure 7:
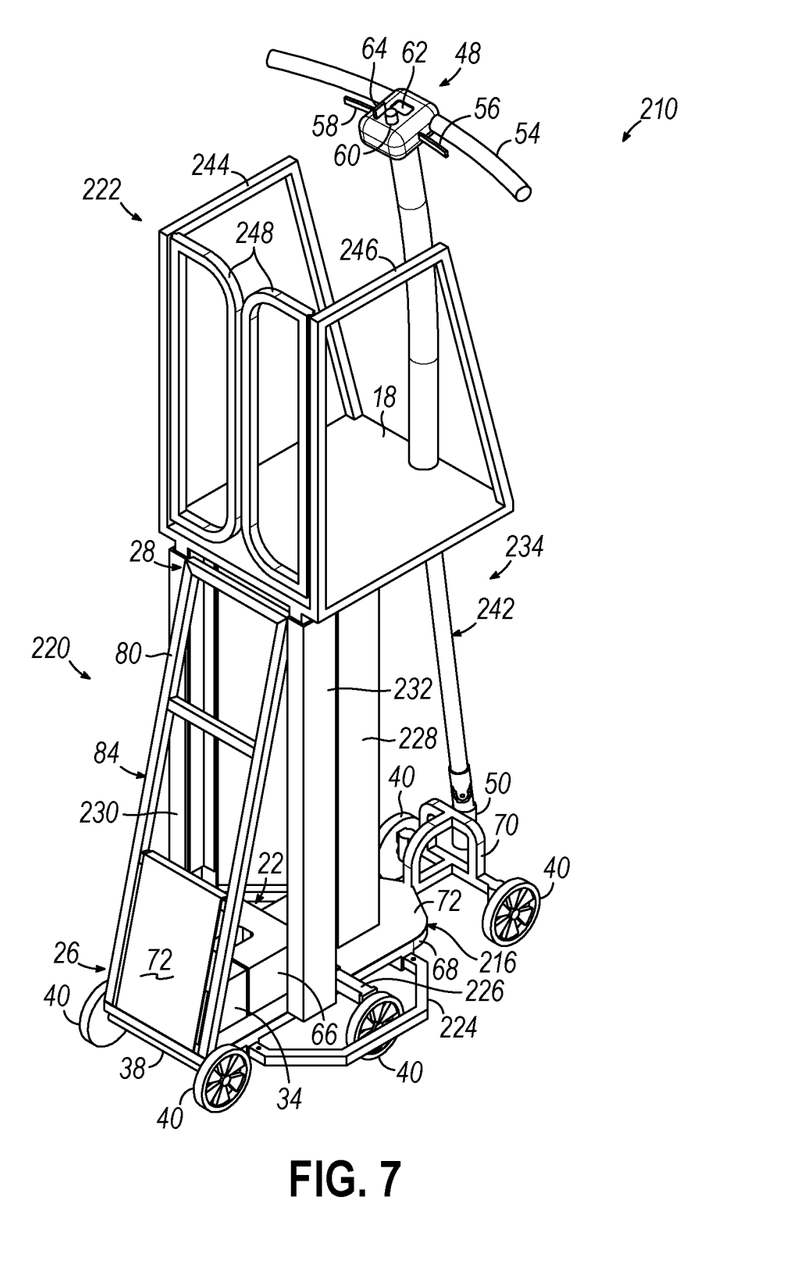
FIG. 7 is a rear perspective view of a second embodiment of a vehicle for tending to an elevated livestock cage.
Figure 8:
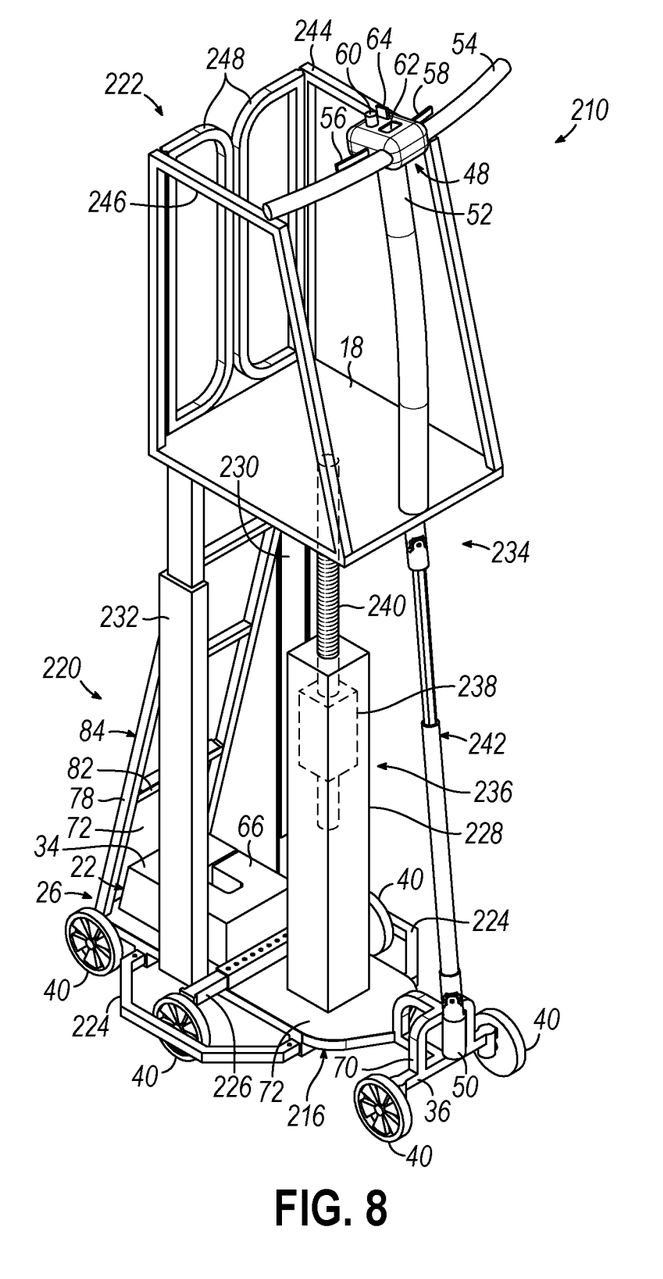
FIG. 8 is a front perspective view of the vehicle of FIG. 7.

FIGS. 7 and 8 show a second exemplary embodiment of a vehicle 210 having various features that may be incorporated into the vehicle 210 in whole or in part in which like numbers indicate like features described above. In addition, the vehicle 210 includes an adjustable support frame 220 for varying the height 30 (see FIG. 2) of the elevated platform 18 and a guide rail 222 generally surrounding the periphery of the elevated platform 18. A base 216 includes a center axle 226 operatively connected to additional wheels 40 and a pair of outriggers 224 for further inhibiting the vehicle 210 from overturning during operation.

With respect to varying the height 30 of the elevated platform 18, the adjustable support frame 220 includes a core support member 228, first and second variable support members 230, 232, a variable steering mechanism 234, and a lifting device 236 operatively driven to raise and lower the elevated platform 18. The core support member 228 is affixed to the base 216 and extends toward the upper portion 28 of the adjustable support frame 220. The lifting device 236 is coupled between the core support member 228 and the elevated platform 18. The lifting device 236 may extend or retract in length in order to vary the height 30 of the elevated platform 18 attached thereto. As shown in FIG. 8, the lifting device 236 is a screw jack rigidly affixed to the core support member 228 and rotatably affixed to the elevated platform 18 so that an electric motor 238 may rotatably drive a threaded element 240 to vary the height 30.

To accommodate the variable height 30 (see FIG. 2), the remaining portion of the support frame 220 and steering mechanism 234 may also extend and retract. Thus, the elevated platform 18 is further supported by the first and second variable support members 230, 232. The first and second variable support members 230, 232 are connected to the base 216 and elevated platform 18 at the lower and upper portions 26, 28, respectively. In addition, the first and second variable support members 230, 232 telescopically extends and retracts between the upper and lower portions 26, 28 while the lifting device 236 varies the height of the elevated platform 18. In addition, the steering mechanism 234 includes a variable length steering column 242 that operatively extends and retracts between the bottom end portion 50 and a top end portion 52 to accommodate the varying height 30 (see FIG. 2). As such, the controller 48 remains conveniently located for the operator relative to the elevated platform 18 regardless of the variable height 30 (see FIG. 2). While the exemplary embodiment operatively varies the height of the elevated platform 18 with the adjustable support frame 220 and the variable length steering column 242 described herein, it will be appreciated that any mechanical structure or lifting device capable of varying the height of the elevated platform 18 may similarly be used.

The vehicle 210 may also include the guide rail 222 around the elevated platform 18 for bounding the operator on the elevated platform 18. Accordingly, the guide rail 222 further includes a first and second side rail 244, 246 and a rear rail 248 rearwardly positioned on the elevated platform 18 adjacent to the ladder 84. According to this exemplary embodiment, the first and second side rails 244, 246 are rigidly attached to opposing peripheries of the elevated platform 18 and extend upward therefrom. However, the rear rail 248 is attached to the first and second side rails 244, 246 and extend therebetween. Moreover, the rear rail 248 is movably attached to the first and second side rails 244, 246 for allowing the operator to access the elevated platform 18. However, it will be appreciated that any mechanical structure for bounding the operator to the elevated platform 18 may similarly be used.

In order to further inhibit the vehicle 210 from overturning during operation, the base 216 may include the center axle 226 operatively connected to additional wheels 40 with the pair of outriggers 224 extending outwardly beyond the center axle 226. Generally, the pair of outriggers 224 extend outwardly from the base 216 of the vehicle 210 to brace the vehicle 210 in the event that the vehicle 210 begins to overturn during use. Moreover, the pair of outriggers 224 may adjustably extend from the base 216 for accommodating various aisles 14 within the confinement facility having various widths. The center axle 226 is operatively connected to additional wheels 40 to further inhibit the vehicle from overturning by increasing the number of contacts with the floor 32. Thus, in the event that the floor 32 becomes uneven or otherwise irregular, the additional wheels 40 will further support the base 216. However, it will be appreciated that any mechanical structure that extends outwardly from the vehicle 210 for further inhibiting the vehicle 210 from overturning may be used. As such, the pair of outriggers 224 and the center axle 226 are not intended to be limited to the exemplary embodiment described herein.

Figure 9:
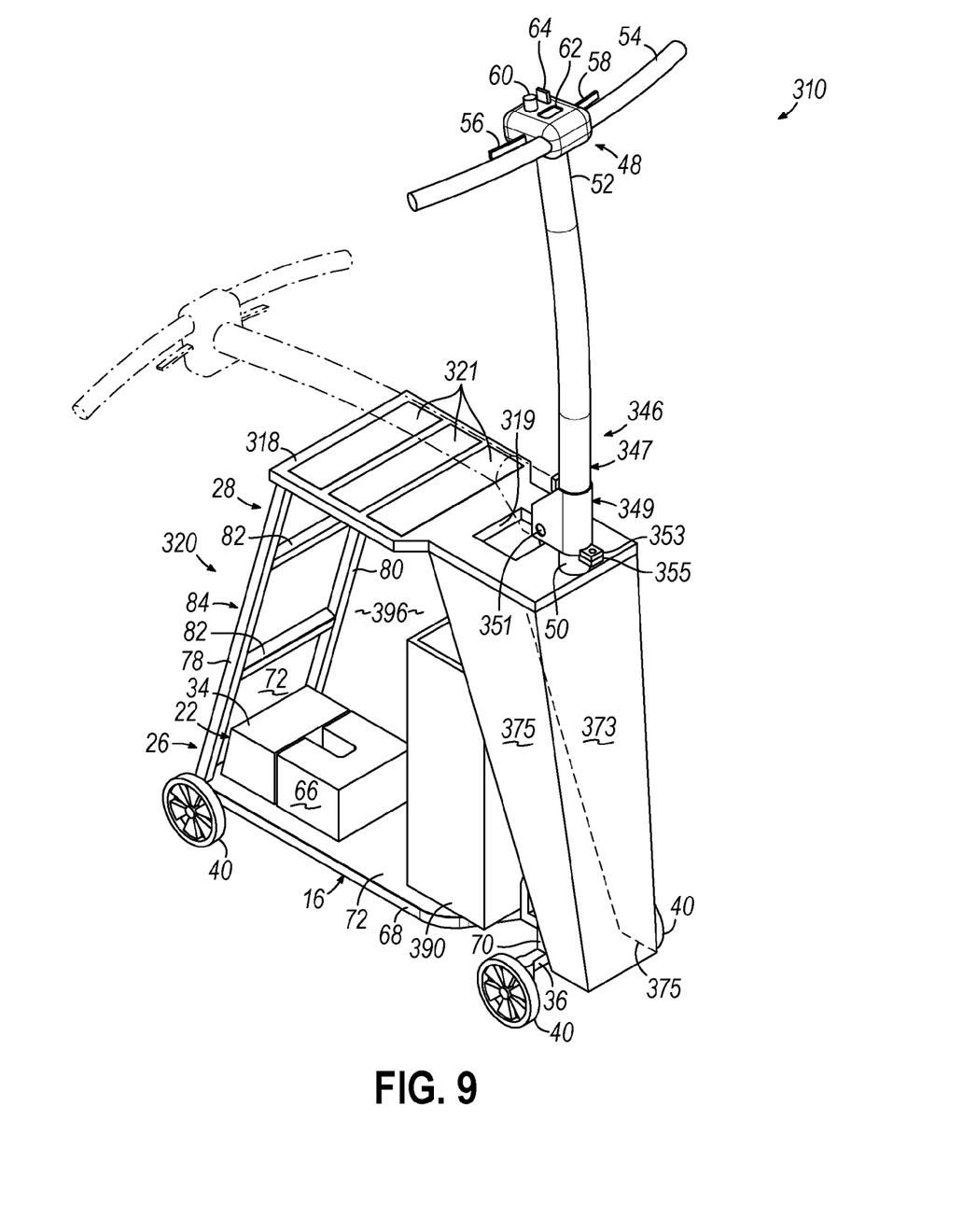
FIG. 9 is a front perspective view of a third embodiment of a vehicle for tending to an elevated livestock cage.

FIG. 9 shows a third exemplary embodiment of a vehicle 310 having various features that may be incorporated into the vehicle 310 in whole or in part in which like numbers indicate like features described above. However, the vehicle 310 differs from the above exemplary embodiments by including an enlarged elevated platform 318 connected to a support frame 320. Notably, the enlarged elevated platform 318 extends horizontally from the upper portion 28 to a steering mechanism 346. Because the enlarged elevated platform 318 extends to the steering mechanism 346, the enlarged elevated platform 318 also includes a waste passage 319 for disposing waste into a waste container 390. More particularly, the waste passage 319 extends through the enlarged elevated platform 318 generally above the waste container 390. As such, the operator may drop waste through the waste passage 319 and into the waste container 390 while the operator is positioned on the enlarged elevated platform 318. The enlarged elevated platform 318 further includes a plurality of grip surfaces 321 for improving traction between the operator and the enlarged elevated platform 318 during use.

The vehicle 310 further includes the support frame 320 generally similar to that describe above. However, the support frame 320 does not include the central support member 74 (see FIG. 1), because the enlarged elevated platform 318 is large enough to extend above a space 396 defined by the remaining support frame 320. The space 396 is configured to receive the waste container 390, which may be removably attached to the support frame 320 while resting on the base 16.

The steering mechanism 346 also operates as generally described above; however, the steering mechanism 346 includes a foldable steering column 347 for reducing an overall height of the vehicle 310. The foldable steering column 347 includes the top end portion 52 pivotably attached to the bottom end portion 50 for pivoting the top end portion 52 between a generally vertical position and a generally horizontal position. Specifically, the top end portion 52 includes a collar 349 adjacent to the bottom end portion 50. The collar 349 pivots about a fastener 351, which is rigidly affixed relative to the bottom end portion 50. The collar 349 includes an upper tab 353 that aligns with a lower tab 355 connected to the bottom end portion 50 in the generally vertical position. As such, the upper and lower tabs 353, 355 are rigidly connected together via a lock fastener (not shown) to rigidly affix the top end portion 52 in the generally vertical position. However, by disconnecting the lock fastener (not shown) from the upper and lower tabs 353, 355, the top end portion 52 pivots to the generally horizontal position and rests on the enlarged elevated platform 318.

The vehicle 310 also includes a front panel 373 and a pair of side panels 375 surrounding at least a portion of the steering mechanism 346. According to an exemplary embodiment, the front and side panels 373, 375 extend upward from the front frame 70 to the enlarged elevated platform 318 surrounding at least a portion of the bottom end portion 50 of the steering mechanism 346. As such, the front and side panels 373, 375 are configured to cover portions of the bottom end portion 50 of the steering mechanism 346 in order to reduce the likelihood of the operator inadvertently contacting the steering mechanism 346 during use.

In use, an operator tends to a plurality of elevated livestock cages 12 with any of the vehicles 10, 210, 310 described above being disposed within the aisle 14 of the confinement facility as shown in FIGS. 1-9. However, the following will describe the use of the first embodiment of the vehicle 10 shown in FIGS. 1-6. As such, the operator ascends onto the elevated platform 18 via the ladder 84 extending downward from the elevated platform 18. The elevated platform 18 supports the operator at a position and height 30 from which the operator may access at least any one of the plurality of elevated livestock cages 12. The operator powers the drive unit 22 and actuates the vehicle 10 to position the vehicle 10 and the operator adjacent to at least one of the plurality of elevated livestock cages 12. Actuating the vehicle 10 may further include driving, steering, and stopping the vehicle 10 along the aisle 14 adjacent to the plurality of elevated livestock cages 12.

From a position on the elevated platform 18, the operator may inspect at least one of the plurality of elevated livestock cages 12. After inspection, the operator may further access at least one of the plurality of elevated livestock cages 12 in order to perform maintenance or collect waste from within the elevated livestock cage 12. In the case of performing maintenance, the operator may remove and/or replace tools from within the storage container 92 while maintaining the elevated livestock cage 12. The operator may also collect waste and place the waste within the waste container 90. Following inspection, maintenance, or waste collection, the operator may observe at least another of the plurality of elevated livestock cages 12 and move the vehicle 10 along the aisle 14 with the plurality of elevated livestock cages 12. Generally, the operator may repeat this method for tending to the elevated livestock cage 12 for each of the plurality of elevated livestock cages 12 within the confinement facility.

In the event that the operator is using an exemplary embodiment of the vehicle 10 having the adjustable support frame 220, the guiderail 222, the pair of outriggers 224, and the center axle 226, the operator may set the pair of outriggers 224 and the center axle 226 to the adjustable width generally appropriate for the width of the aisle 14 within the confinement facility. Accordingly, the pair of outriggers 224 may be positioned to extend adjacent to the elevated livestock cages 12 along the aisle 14 without contacting elevated livestock cages 12. Furthermore, the operator opens and closes the guide rail 222 adjacent to the ladder 84 in order to access the elevated platform 18. Finally, the operator may vary the height 30 of the elevated platform 18 in order to improve access to elevated livestock cages 12 at various heights from the floor 32.

While the present invention has been illustrated by the description of one or more embodiments thereof, and while the embodiments have been described in considerable detail, they are not intended to restrict or in any way limit the scope of the appended claims to such detail. Various features of the vehicle 10 shown and described herein may be used alone or in any combination. Additional advantages and modifications will readily appear to those skilled in the art. The invention in its broader aspects is therefore not limited to the specific details, representative apparatus and method and illustrative examples shown and described. Accordingly, departures may be from such details without departing from the scope or spirit of the general inventive concept.

What is claimed is:

1. A vehicle for tending to an elevated livestock cage along an aisle in a confinement facility, comprising:
    a support frame extending vertically upward from a base, the support frame having a lower portion and an upper portion, the base having a rearward portion and a forward portion, and the base extending from the rearward portion to the forward portion thereof;
    a drive unit attached to the base for moving the base along the aisle and including a plurality of wheels configured to support the base, at least one wheel being adapted to drive the base and at least one wheel being adapted to steer the base;
    a power source operatively connected to the drive unit and supported on the base;
    an elevated platform affixed to the upper portion of the support frame, the elevated platform positioned above the base at a height suitable to facilitate access to the elevated livestock cage;
    a waste container positioned vertically beneath the elevated platform, the waste container being accessible from the elevated platform for disposing waste collected while tending the elevated livestock cage; and
    a steering mechanism including:
        a steering column having a bottom end portion and a top end portion, the bottom end portion attached to the forward portion of the base and being operably connected to the at least one wheel adapted to steer the base, the top end portion extending above the elevated platform, wherein the waste container is positioned horizontally between the power source and the steering column;
        a connecting member extending between the steering column and the elevated platform and attached to each of the steering column and the elevated platform such that the connecting member holds the steering column adjacent to the elevated platform; and
        a controller attached to the top end portion of the steering column, the controller adapted to selectively direct the at least one wheel configured to drive the base and the at least one wheel configured to steer the base, the controller including a handle rigidly attached to the top end portion for manually steering the vehicle and at least one of: (a) a forward and reverse lever operatively communicating with the drive unit, or (b) a speed knob for setting movement of the vehicle to a desired speed,
    wherein the support frame and the elevated platform are configured for supporting an operator while moving along the aisle of the confinement facility.

2. The vehicle of claim 1 wherein the height of the elevated platform is fixed between approximately four feet and approximately fifteen feet for accessing the elevated livestock cage.

3. The vehicle of claim 1 further comprising an overall width adapted to fit within the aisle for moving along the aisle of the livestock confinement facility.

4. The vehicle of claim 3 wherein the overall width is less than 50 inches for fitting within the aisle.

5. The vehicle of claim 4 wherein the overall width is approximately 19 inches for fitting within the aisle.

6. The vehicle of claim 1 further comprising a ladder extending along at least a portion of the support frame to the elevated platform.

7. The vehicle of claim 1 wherein the support frame defines a space, the space being at least partially below the elevated platform and configured to receive the waste container.

8. The vehicle of claim 7 wherein the waste container is removably mounted to the support frame within the space.

9. The vehicle of claim 1 further comprising a storage container positioned proximate to the elevated platform for providing the operator with a convenient storage location.

10. The vehicle of claim 1 further comprising a seat affixed on top of the elevated platform.

11. The vehicle of claim 1 wherein the power source includes a battery.

12. The vehicle of claim 1 wherein the power source is positioned below the elevated platform.

13. The vehicle of claim 12 wherein the power source is supported on the rearward portion of the base.

14. The vehicle of claim 1 wherein the waste container includes a slot configured to receive a portion of the support frame.

15. The vehicle of claim 1 wherein the elevated platform includes a forward platform edge and the waste container includes a forward container portion, and the forward container portion of the waste container is positioned horizontally forward from the forward platform edge of the elevated platform.

16. The vehicle of claim 15 wherein the elevated platform includes a rearward platform edge and the base includes a rearward base edge, and wherein the rearward platform edge is positioned horizontally forward rearward base edge.

17. The vehicle of claim 16 further comprising a ladder extending between the rearward platform edge and the rearward base edge.

* * * * *